United States Patent
Martin

(10) Patent No.: US 9,352,786 B1
(45) Date of Patent: May 31, 2016

(54) VEHICLE MUD FLAP RETRACTION ASSEMBLY

(71) Applicant: Murray S. Martin, Lititz, PA (US)

(72) Inventor: Murray S. Martin, Lititz, PA (US)

( * ) Notice: Subject to any disclaimer, the term of this patent is extended or adjusted under 35 U.S.C. 154(b) by 0 days.

(21) Appl. No.: 14/969,493

(22) Filed: Dec. 15, 2015

(51) Int. Cl.
 *B62D 25/18* (2006.01)

(52) U.S. Cl.
 CPC .................................. *B62D 25/182* (2013.01)

(58) Field of Classification Search
 CPC ...... B62D 25/16; B62D 25/166; B62D 25/18; B62D 25/182; B62D 25/184; B62D 25/186; B62D 25/188
 See application file for complete search history.

(56) References Cited

U.S. PATENT DOCUMENTS

| | | | |
|---|---|---|---|
| 2,721,760 A | 10/1955 | Lapham et al. | |
| 2,857,200 A | 10/1958 | Hoppesch | |
| 2,981,553 A | 4/1961 | Zerbe | |
| 3,165,360 A | 1/1965 | Saxton et al. | |
| 3,582,109 A | 6/1971 | Moore | |
| 4,097,090 A | 6/1978 | Payne | |
| 4,784,400 A * | 11/1988 | Hofius | B60S 9/10 254/122 |
| 4,966,378 A * | 10/1990 | Cook | B62D 25/188 280/154 |
| 5,582,431 A | 12/1996 | Anderson | |
| 6,139,062 A | 10/2000 | Meyer | |
| 6,158,775 A * | 12/2000 | Nickels | B62D 25/188 280/154 |
| 6,565,122 B1 | 5/2003 | Hansen | |
| 6,799,808 B1 | 10/2004 | Walters | |
| 7,708,315 B1 | 5/2010 | Dumitrascu | |
| 7,850,206 B2 | 12/2010 | Proctor | |
| 2004/0164539 A1 | 8/2004 | Bernard | |
| 2011/0067279 A1* | 3/2011 | Dos Santos Camacho | G09F 7/22 40/601 |
| 2012/0068448 A1 | 3/2012 | Lasser | |

\* cited by examiner

*Primary Examiner* — Frank Vanaman
(74) *Attorney, Agent, or Firm* — Hooker & Habib, P.C.

(57) ABSTRACT

A mud flap retraction assembly that allows actuating a vehicle's rear mud flaps between lower and upper positions.

20 Claims, 5 Drawing Sheets

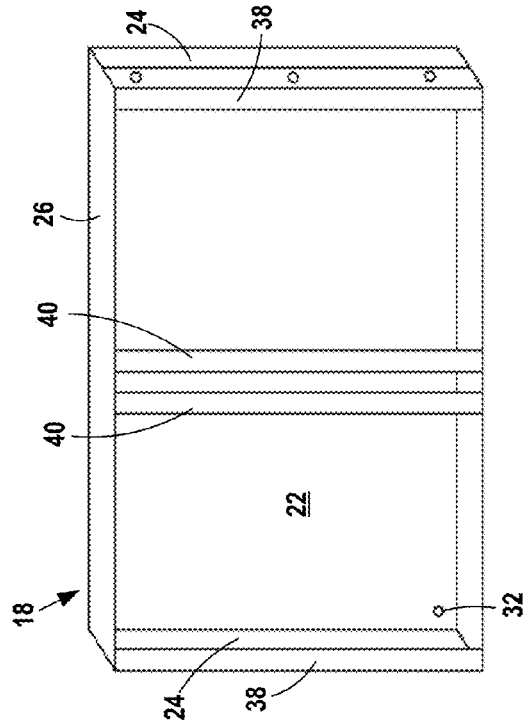
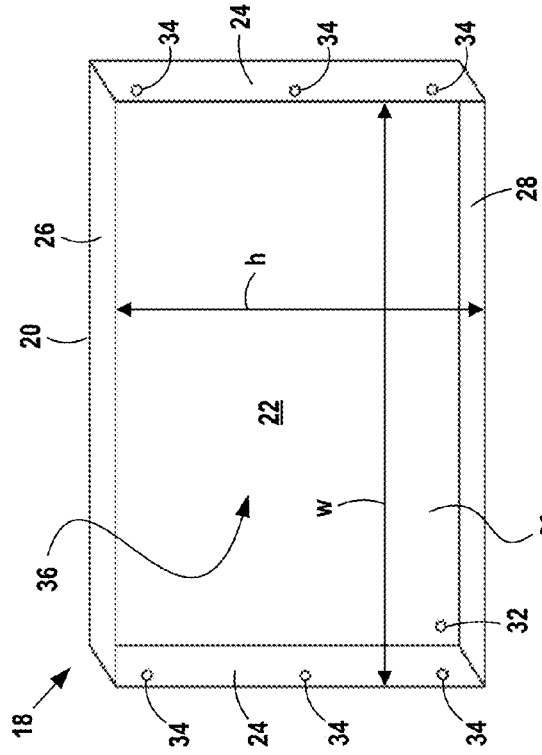
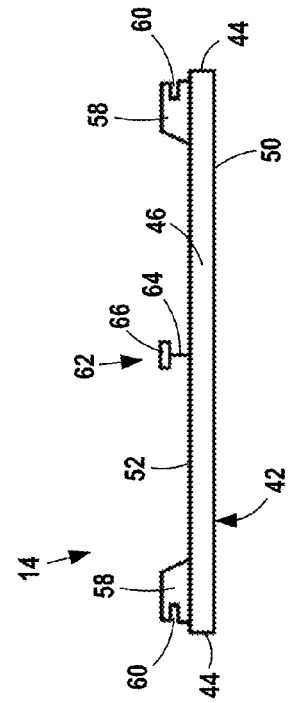
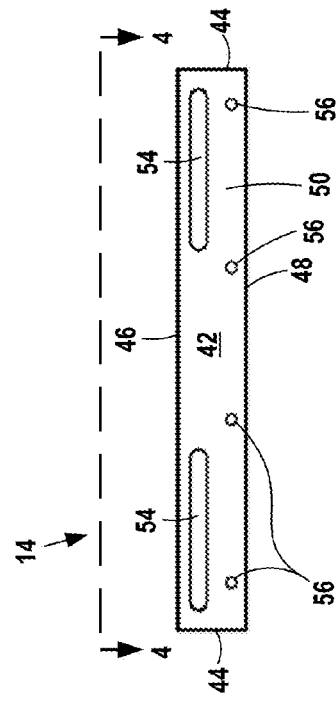

VEHICLE MUD FLAP RETRACTION ASSEMBLY

FIELD OF THE DISCLOSURE

The disclosure relates generally to mud flap retraction assemblies for vehicles, particularly dump trucks. The disclosure relates specifically to mud flap retraction assemblies that allow actuating a vehicle's rear mud flaps between lower and upper positions.

BACKGROUND OF THE DISCLOSURE

State and federal regulations require certain vehicles to have a mud flaps or splash guards located behind vehicle rear wheels. Regulations are particularly directed toward large trucks and dump trucks so that the flaps protect other vehicles from water spray, rocks and like debris from being dispelled from truck rear wheels.

Problems arise when required flaps are incorporated behind the rear wheels of dump trucks having tilting dump beds. Conventional dump truck flaps are rigidly secured to the truck's frame in a low hanging configuration to meet regulation requirements. As an operator travels in reverse toward a dump site, flaps may make undesired contact with previously discharged contents, causing damage to the flaps. Also, as a truck discharges material from the truck storage bed, a pile of discharged material collects at the truck rear. The discharged material may surround the flaps to an extent that trap the flaps within the discharged material pile. Force applied by the truck to disengage the flaps from the pile can damage the flaps, requiring premature flap replacement.

Old systems for actuating vehicle mud flaps that include drive mechanisms such as long wires, drive pistons and the like extending along the bottom of a truck's storage bed. These systems have many moving parts, are difficult to maintain are vulnerable to damage from road debris during truck operation. Malfunction of these old systems present a safety danger as drive mechanism moving parts may become damaged. Damaged mechanisms in turn inflict damage to the vehicle or injure close-by individuals.

SUMMARY OF THE DISCLOSURE

Disclosed is an assembly for actuating a vehicle's rear mud flaps between a lower and upper position. In the case of dump truck vehicles, actuating the flaps to an upper position prevents flap damage when the dump truck drives in reverse toward ground debris and is unloading materials.

The disclosed assembly efficiently actuates vehicle mud flaps between upper and lower positions. The assembly is compact with moving parts contained within a housing mounted to the rear of the vehicle. The assembly is easy to maintain and is removed from potentially damaging road debris during truck operation. Containing moving parts within the housing allows the system to operate with improved safety over old systems so that moving parts cannot damage a vehicle or close-by individuals.

In possible assembly embodiments, the drive actuator may include a cylinder or like actuator capable of exerting linear extension and retraction forces to the assembly. In embodiments, cylinders may be a pneumatic cylinder powered by an air system installed on the vehicle or a hydraulic cylinder powered by a hydraulic system installed on the vehicle. In alternate embodiments, the drive actuator may include more than one cylinder.

Other objects and features of the disclosure will become apparent as the description proceeds, especially when taken in conjunction with the accompanying drawing sheets illustrating one or more illustrative embodiments.

BRIEF SUMMARY OF THE DRAWINGS

FIGS. 1 and 2 are front views of a partial assembly housing;
FIG. 3 is a front view of an assembly beam support;
FIG. 4 is a top view of the assembly beam support taken along line 4-4 of FIG. 3.

DETAILED DESCRIPTION

Figure 5:
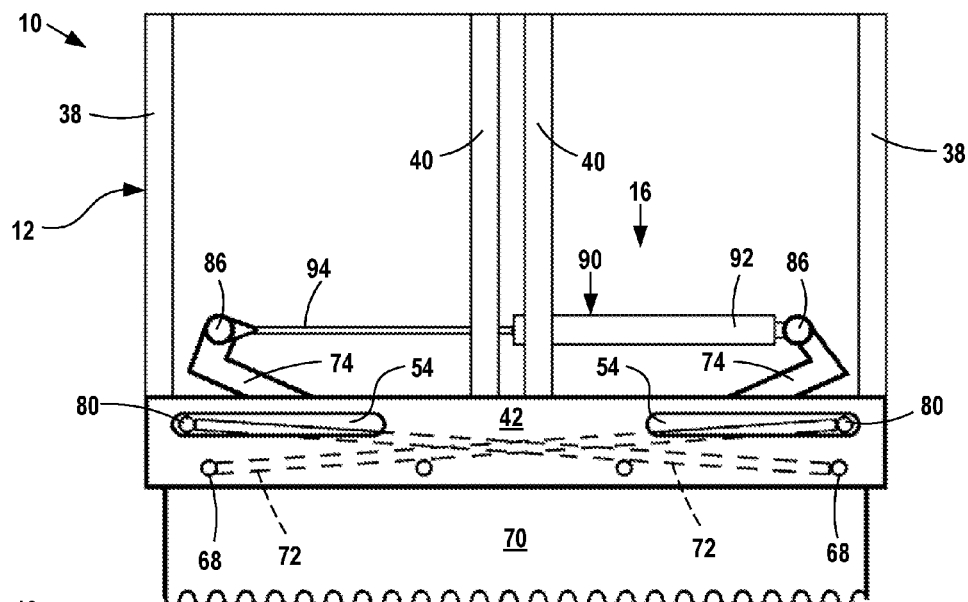
FIG. 5 is a front view of the mud flap retraction assembly in a lower position.

Mud flap retraction assembly 10 may include a housing 12, a beam support 14 and an actuator assembly 16. See FIG. 5.

Housing 12 is made of a housing pre-form 18, as shown in FIGS. 1 and 2. Pre-form 18 includes an open sided box 20 having the general shape of a rectangular cuboid having a height h and a width w. Box 20 has a rear surface or rear wall 22, opposed side walls 24, top and bottom walls 26 and 28 and a front opening 30. Rear surface or rear wall 22 includes mounting apertures 32 proximate bottom wall 28. Side walls 24 include a number of mounting apertures 34. See FIG. 1.

Walls 22, 24, 26 and 28 define a housing interior 36 having a rectangular cuboid volume corresponding to box 20.

Figure 7:
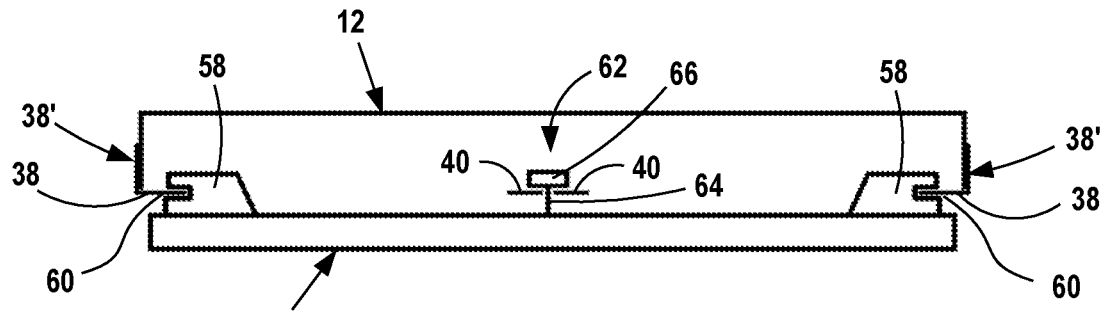
FIG. 7 is a view of the mud flap retraction assembly taken along line 7-7 of FIG. 6.
Figure 8:
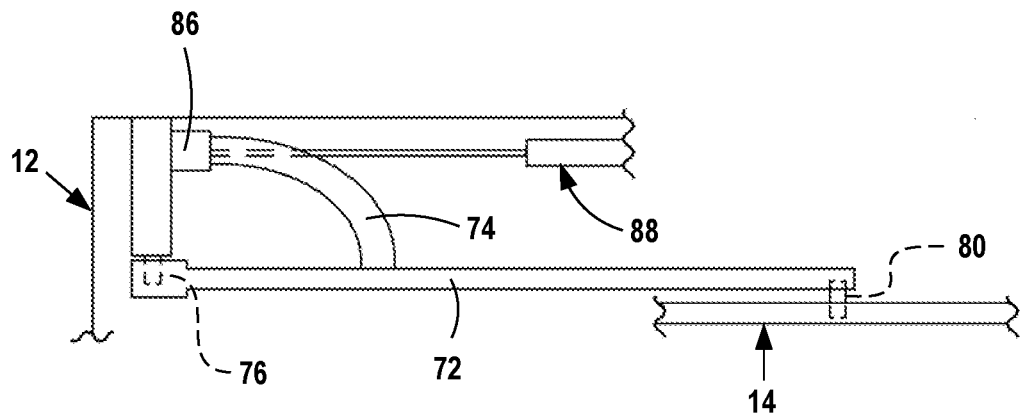
FIG. 8 is a view of the mud flap retraction assembly taken along line 8-8 of FIG. 6.
Figure 9:
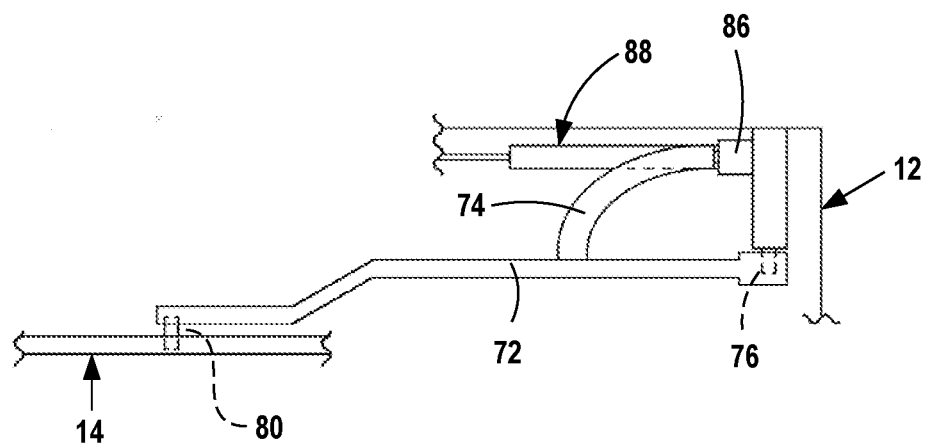
FIG. 9 is a view of the mud flap retraction assembly taken along line 9-9 of FIG. 6.

Side guide rails 38 are mounted to each side wall 24 and extend from bottom wall 28 to top wall 26. Central guide rails 40 are mounted to top and bottom walls 26 and 28 and extend from bottom wall 28 to top wall 26 between side walls 24 along height h. Side guide rails 38 may be formed in part from L-beams 38' mounted to each side wall 24. See FIG. 7.

Beam support 14 has a generally flat and elongate body 42 extending between body sides 44 and body top and bottom 46, 48. Body 42 includes a number of apertures extending from body front surface 50 to body back surface 52. Elongate guide apertures 54 are located proximate body top 46. Mud flap mounting apertures 56 are located proximate body bottom 48.

Beam support rail guides 58 extend outwardly from body back surface 52 near body sides 44. Rail guides 58 include an elongate open rail slot 60 facing toward body side 44. In use, slots 60 engage rails 38 as explained in greater detail below. In embodiments, slots 60 may have include rolling bearings or have sliding, surface-to-surface bearing between guide 58 and rails 38.

Bearing assembly 62 is mounted on body back surface 52 at a midpoint between body sides 44. Assembly 62 includes a mounting stem 64 extending from surface 52 to bearing 66 located from surface 52. In use, bearing assembly 62 engages a central guide rail 40 as explained in greater detail below. In embodiments, bearing 66 may be a rolling rearing or a sliding, surface-to-surface bearing.

Mud flap mounting apertures 56 are used in conjunction with conventional fasteners 68 to attach a conventional vehicle mud flap 70 to beam support 14. See FIG. 5.

Beam support 14 is mounted within housing 12 so that rail guide 58 slots 60 engage side guide rails 38 and bearing assembly 62 engages a central guide rail 40. See FIG. 7. This allows secure motion of beam support 14 between upper and lower positions as explained in greater detail below.

Actuator assembly 16 is mounted within housing 12 to move beam support 14 between upper and lower positions.

Actuator assembly 16 had a pair of elongate drive arms 72. A sub-arm 74 is attached to each arm 72 at a pivoting connector 76.

Upper end 78 of arm 72 includes a bearing 80. The lower end 82 of arm 72 includes a pivoting connector 84.

Figure 6:
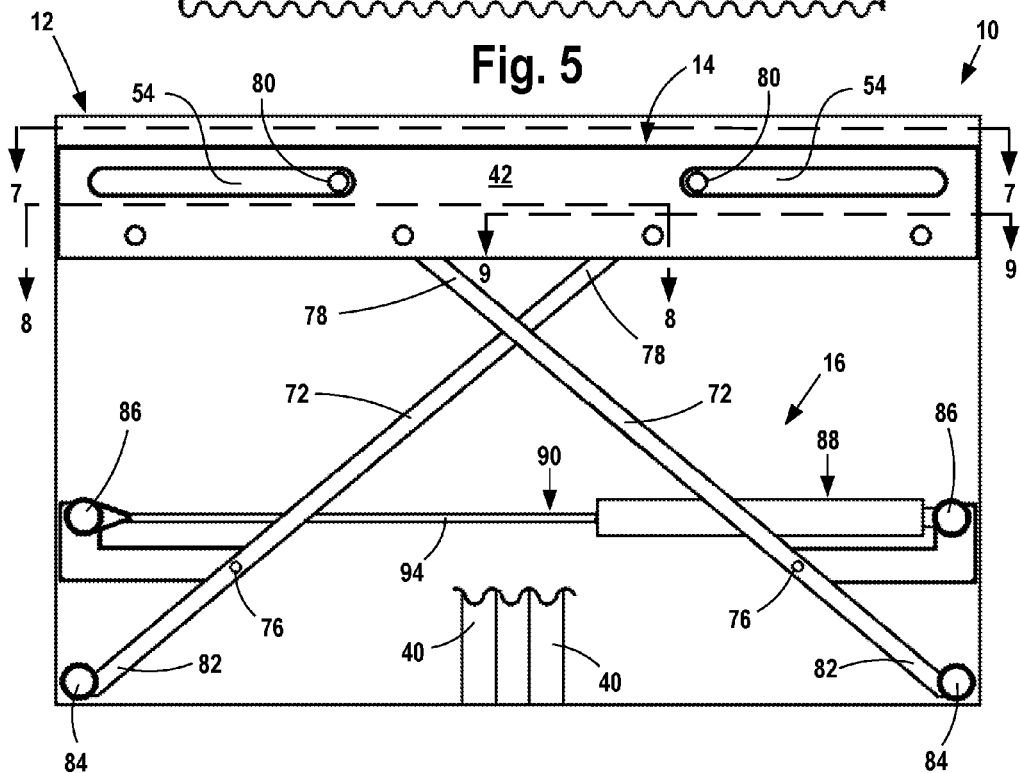
FIG. 6 is a front view of the mud flap retraction assembly in an upper position.

The pair of arms 72 may be oriented to cross-over each other in a general X-shape as shown in FIGS. 5 and 6.

The end of sub-arm 74 away from pivoting connector 76 has a pivoting connector 86 joined to actuator 88. Actuator 88 is capable of exerting linear extension and retraction forces to assembly arms 72, 74. In embodiments, actuator 88 may be a conventional drive cylinder 90 having a drive cylinder portion 92 and a piston rod portion 94. See FIG. 6.

Drive cylinder 90 may be any cylinder capable of generating a reciprocating linear motion. In embodiments, drive cylinder may be a pneumatic cylinder powered by an air system installed on the vehicle upon which assembly 10 is mounted. In other embodiments, drive cylinder 90 may be a hydraulic cylinder powered by a hydraulic system installed on the vehicle.

Sliding bearings 80 engage beam support rail guides 58 to connect actuator assembly 16 to beam support rail 14.

Pivoting connectors 84 engage mounting apertures 32 to join actuator assembly 16 to housing 12.

Figure 10:
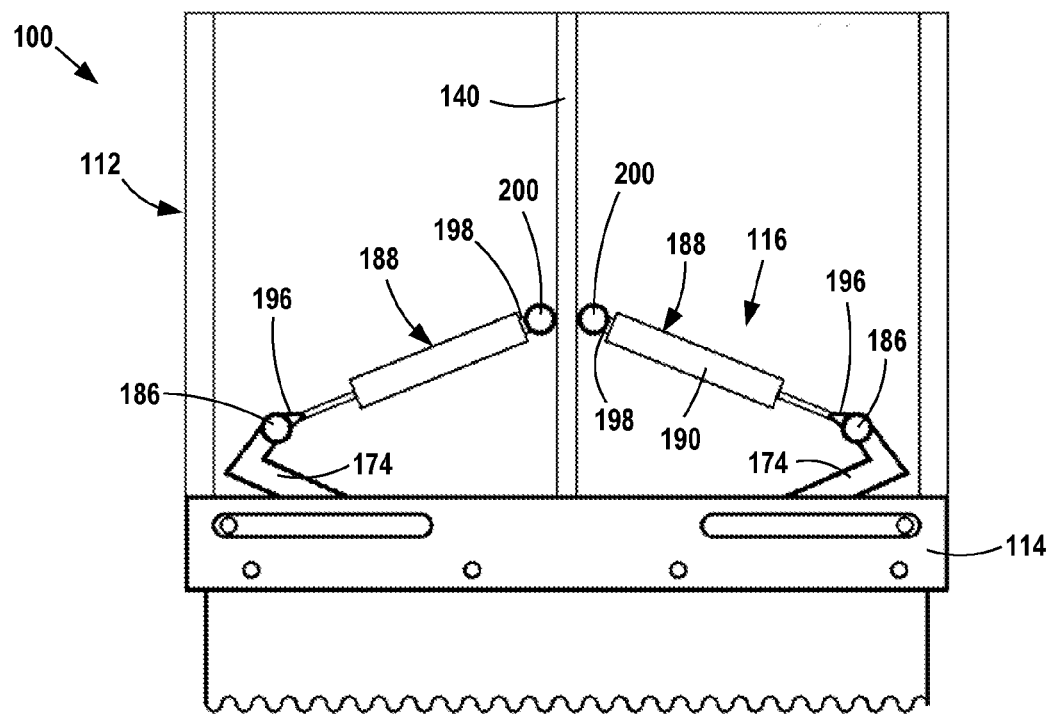
FIG. 10 is a is a front view of an alternate embodiment mud flap retraction assembly in a lower position.
Figure 11:
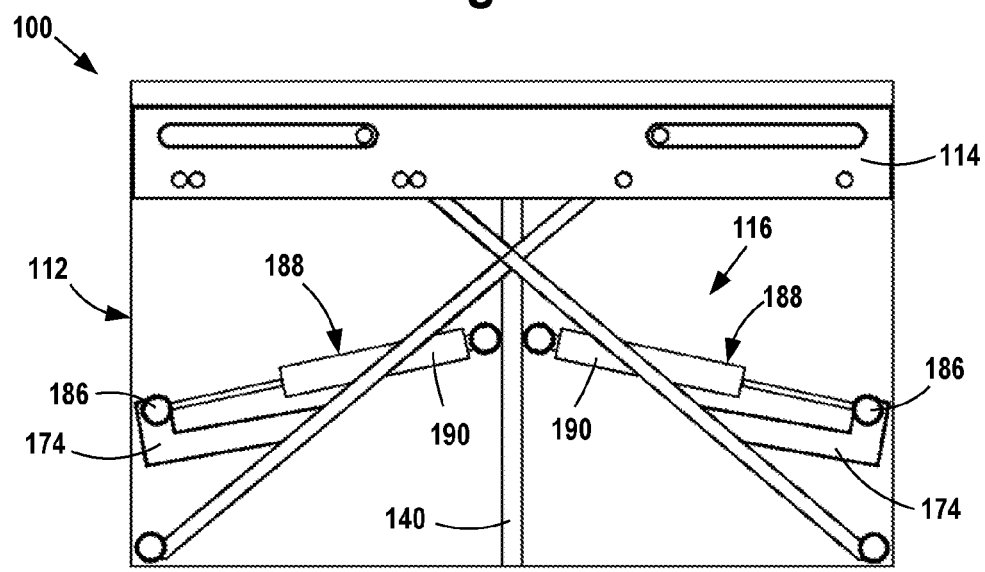
FIG. 11 is a is a front view of an alternate embodiment mud flap retraction assembly in an upper position.

FIGS. 10 and 11 show an alternate embodiment mud flap retraction assembly 100.

Retraction assembly 100 is similar in part to assembly 10 having like housing 112, and like beam support 114.

Retraction assembly 100 actuator assembly 116 is different from actuator assembly 16. Assembly 116 includes an actuator 188 made up of two drive cylinders 190. One end 196 of each drive cylinder 190 is mounted to pivoting connector 186 on each sub-arm 174. The other end 198 of each drive cylinder 190 is mounted to a pivoting connector 200 attached to center rail 140 mounted to housing 112.

Figure 12:
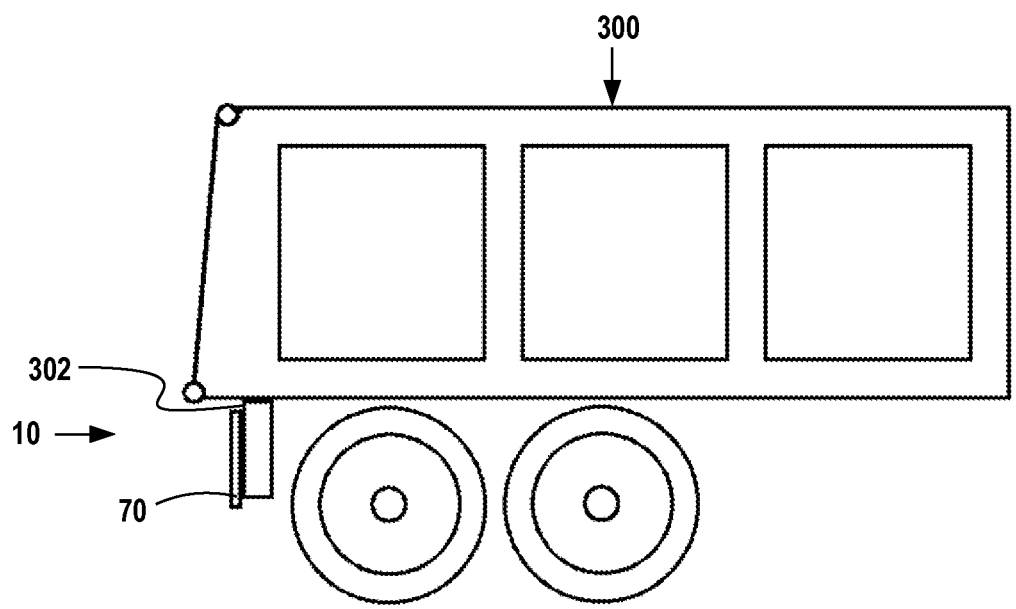
FIGS. 12 and 13 are side views showing the mud flap retraction assembly mounted to a vehicle in lower and upper positions.
Figure 13:
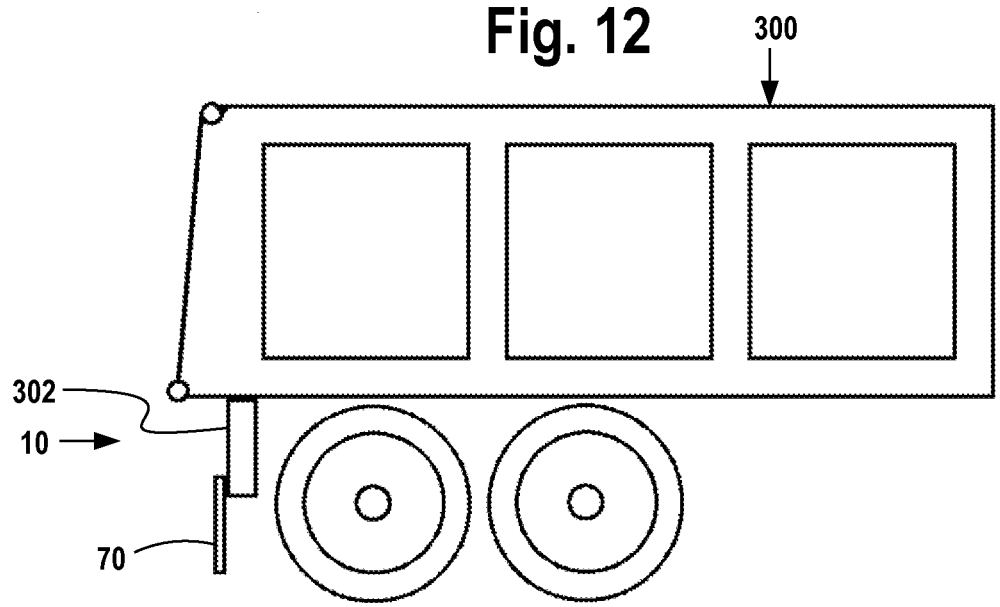

The assembly is mounted to the rear of a vehicle 300 as shown in FIGS. 12 and 13.

In embodiments, the assembly housing 12 may include a front enclosure 302 which engages housing side walls 24 and top and bottom walls 26 and 28 to cover front opening 30 and contain actuator assembly 16 within housing interior 36.

Operation of assembly 10 will now be described.

FIGS. 5 and 13 show the assembly and mud flap 70 in a lowered position, required when the vehicle is used for road travel.

In the lowered position, actuator 88 is in a retracted and non-extended position so that piston rod 94 is not fully extended and beam support 14 is located near the bottom of housing 12. In the non-extended position, arms 72 are likewise folded over one-another and positioned near the bottom of housing 12. See FIG. 5.

As actuator 88 is activated, piston rod 94 linearly extends as shown in FIG. 6. As piston rod 94 extends, it exerts a generally linear extension force on sub-arms 74 to push the ends of the sub-arms away from pivoting connector 76 upward, which in turn, exerts a force to push each arm 72 upward to push beam support 14 upward. As the assembly 10 moves from a lower position to an upper position, sliding bearings 80 move along support rail guide apertures 54 from the outer side of apertures 54 toward the inner side of apertures 54. See FIG. 6.

As beam support 14 is moved upward, attached mud flap 70 likewise moves upward to upper position as shown in FIG. 12.

The process is reversed in order to move flap 70 to a lowered position by activating actuator 88 to linearly retract piston rod 94. As piston rod 94 retracts, it exerts a generally linear retraction force on sub-arms to push arms 72 downward to exert a force that pushes beam support 14 downward toward the bottom of housing 12.

Operation of assembly 100 is similar to the operation of assembly 10 but for the linear extension and retraction forces being generated by the two drive cylinders 190 of actuator 188.

While one or more embodiments have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

What is claimed is:

1. A vehicle mud flap retraction assembly comprising:
   a housing having a height extending between a housing bottom and top and a width extending between housing sides, a pair of elongate side rails at the housing sides oriented generally parallel to each other and extending generally along the housing height;
   a beam support having an elongate body having a height extending between a beam support bottom and a beam support top and a width extending between beam support sides, a rail guide at each beam support side, each rail guide having a guide slot engaging a side rail, the beam support body having a pair of elongate guide apertures, the guide apertures extending along the body width generally co-linear with each other;
   an actuator assembly having a pair of elongate drive arms crossing each other in an X-shape, one end of each drive arm joined to the housing at a pivoting connector on one housing side and extending to a bearing connector at the other drive arm end, the bearing connector engaging a beam elongate guide aperture at the other housing side, a sub-arm attached to each drive arm at a pivoting connector located between the drive arm ends, the sub-arm extending to an actuator pivoting connector, an actuator joined to and extending between the sub-arm actuator pivoting connectors;
   wherein the actuator exerts a linear force generally co-linear with the housing width on the sub-arms and drive arms to actuate the beam support between a lower position proximate the housing bottom wherein the actuator is in a first, non-extended state and an upper position proximate the housing top wherein the actuator is in a second extended state.

2. The assembly of claim 1 comprising a vehicle mud flap joined to the beam support and extending from the bottom of the beam support.

3. The assembly of claim 2 comprising one or more central guide rails located between the side rails and extending generally parallel the side rails and the beam support comprises a bearing assembly engaging at least one central guide rail.

4. The assembly of claim 3 wherein the actuator comprises a drive cylinder.

5. The assembly of claim 4 wherein the drive cylinder is a pneumatic cylinder.

6. The assembly of claim 5 wherein the assembly is installed on a vehicle comprising an air system and the pneumatic cylinder is powered by the air system.

7. The assembly of claim 4 wherein the drive cylinder is a hydraulic cylinder.

8. The assembly of claim 7 wherein the assembly is installed on a vehicle comprising a hydraulic system and the hydraulic cylinder is powered by the hydraulic system.

9. The assembly of claim 4 wherein the assembly is installed on a vehicle having a vehicle rear, the housing bottom, top and sides comprise walls, the housing further comprising a rear wall and a front enclosure, the assembly joined to the vehicle rear at the rear wall.

10. The assembly of claim 1 wherein the actuator comprises two drive cylinders.

11. A mud flap retraction assembly comprising a housing having a height extending between a housing bottom wall and a housing top wall and a width extending between housing side walls, a pair of elongate side rails proximate the housing side walls, oriented generally parallel to each other and extending generally along the housing height, a beam support having an elongate body with a top, bottom and sides, the beam support body having a height extending between the beam support bottom and top and a width extending between the beam support sides, the beam support body having a pair of elongate guide apertures extending though the beam support body along the body width, the guide apertures oriented generally co-linear with each other, a rail guide at each beam support side having a guide slot engaging a side rail, a vehicle mud flap joined to the beam support and extending from the bottom of the beam support, an actuator assembly having a pair of elongate drive arms crossing each other in an X-shape, one end of each drive arm joined to the housing at a pivoting connector on one housing side and extending to a bearing connector at the other drive arm end, the bearing connector engaging a beam elongate guide aperture at the other housing side, a sub-arm attached to each drive arm at a pivoting connector located between the drive arm ends and extending to an actuator pivoting connector, an actuator joined to and extending between the sub-arm actuator pivoting connectors, the assembly having a lower position wherein the actuator is in a first, non-extended state and the beam support is proximate the housing bottom and an upper position wherein the actuator is in an extended state and the beam support is proximate the housing top.

12. The assembly of claim 11 wherein the assembly is installed on a vehicle.

13. The assembly of claim 12 wherein the actuator comprises a drive cylinder.

14. The assembly of claim 13 wherein the drive cylinder is a pneumatic cylinder or a hydraulic cylinder.

15. The assembly of claim 13 wherein the drive cylinder is powered by an air or a pneumatic system installed on the vehicle.

16. The assembly of claim 15 wherein the vehicle has a vehicle rear the housing further comprising a rear wall and a front enclosure, the assembly joined to the vehicle rear at the rear wall.

17. The assembly of claim 11 wherein the actuator comprises two drive cylinders.

18. A vehicle mud flap retraction assembly comprising:
a housing having a height extending between a housing bottom and top and a width extending between housing sides, a pair of elongate side rails at the housing sides oriented generally parallel to each other and extending generally along the housing height, a beam support having an elongate body having a height extending between a beam support bottom and a beam support top and a width extending between beam support sides, a rail guide at each beam support side, each rail guide having a guide slot engaging a side rail, the beam support body having a pair of elongate guide apertures, the guide apertures extending along the body width generally co-linear with each other, an actuator assembly having a pair of elongate drive arms crossing each other in an X-shape, one end of each drive arm joined to the housing at a pivoting connector on one housing side and extending to a bearing connector at the other drive arm end, the bearing connector engaging a beam elongate guide aperture at the other housing side, a sub-arm attached to each drive arm at a pivoting connector located between the drive arm ends, the sub-arm extending to an actuator pivoting connector and means for exerting a linear force on the sub-arms and drive arms to actuate the beam support between a lower position proximate the housing bottom and an upper position proximate the housing top.

19. The assembly of claim 18 wherein the means for exerting the linear force on the sub-arms and drive arms comprise a drive cylinder.

20. The assembly of claim 18 wherein the means for exerting the linear force on the sub-arms and drive arms comprise two drive cylinders.

* * * * *